(12) United States Patent
Wang et al.

(10) Patent No.: US 9,183,152 B2
(45) Date of Patent: Nov. 10, 2015

(54) SYSTEM AND METHOD FOR PROVIDING INSTANT VIDEO IN AN INFORMATION HANDLING SYSTEM

(71) Applicant: Dell Products, LP, Round Rock, TX (US)

(72) Inventors: Bi-Chong Wang, Austin, TX (US); Austin P. Bolen, Austin, TX (US); Madhusudhan Rangarajan, Portland, OR (US)

(73) Assignee: Dell Products, LLP, Round Rock, TX (US)

( * ) Notice: Subject to any disclaimer, the term of this patent is extended or adjusted under 35 U.S.C. 154(b) by 0 days.

(21) Appl. No.: 14/492,841

(22) Filed: Sep. 22, 2014

(65) Prior Publication Data

US 2015/0009225 A1  Jan. 8, 2015

Related U.S. Application Data

(63) Continuation of application No. 12/941,544, filed on Nov. 8, 2010, now Pat. No. 8,847,967.

(51) Int. Cl.
G09G 5/36 (2006.01)
G06F 12/08 (2006.01)
G06F 9/44 (2006.01)

(52) U.S. Cl.
CPC .......... *G06F 12/0862* (2013.01); *G06F 9/4401* (2013.01); *G06F 9/4411* (2013.01)

(58) Field of Classification Search
CPC .................... G06F 9/4403; G06F 2212/2515
USPC .................................. 345/530, 531, 557, 538
See application file for complete search history.

(56) References Cited

U.S. PATENT DOCUMENTS

| | | |
|---|---|---|
| 6,393,586 B1 | 5/2002 | Sloan et al. |
| 6,636,185 B1 | 10/2003 | Spitzer et al. |
| 6,704,840 B2 | 3/2004 | Nalawadi et al. |
| 2008/0005549 A1 | 1/2008 | Ke |
| 2008/0244250 A1 | 10/2008 | Swanson et al. |
| 2012/0117302 A1 | 5/2012 | Wang et al. |

*Primary Examiner* — Hau Nguyen
(74) *Attorney, Agent, or Firm* — Larson Newman, LLP

(57) ABSTRACT

Before initializing a memory of an information handling system, a method includes loading an image of a video option ROM code for a graphics interface device to a cache associated with a processor of the information handling system, and executing the video option ROM code to initialize the graphics interface device. The method also includes executing a memory reference code to initialize the memory, and while executing the memory reference code, providing status information from the graphics interface device.

20 Claims, 3 Drawing Sheets

SYSTEM AND METHOD FOR PROVIDING INSTANT VIDEO IN AN INFORMATION HANDLING SYSTEM

CROSS REFERENCE TO RELATED APPLICATIONS

This application is a continuation of U.S. patent application Ser. No. 12/941,544, entitled "System and Method for Providing Instant Video in an information Handling System," filed on Nov. 8, 2010, the disclosure of which is hereby expressly incorporated by reference in its entirety.

FIELD OF THE DISCLOSURE

This disclosure relates generally to information handling systems, and relates more particularly to providing instant video in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

Figure 1:
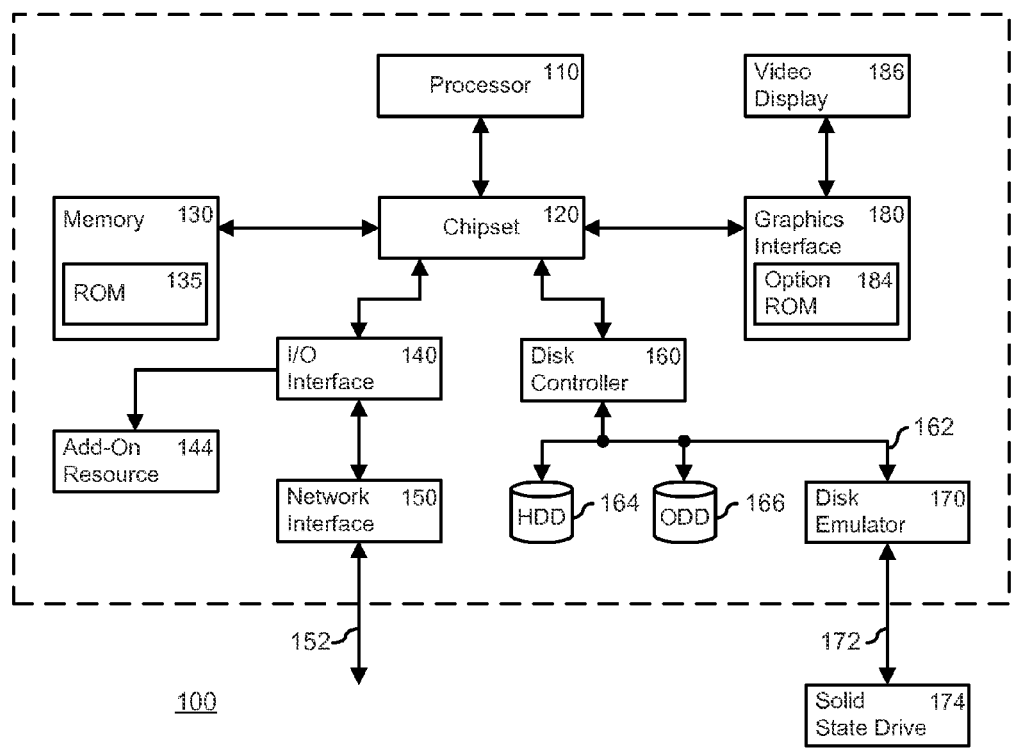
FIG. 1 is a functional block diagram illustrating an exemplary embodiment of an information handling system according to the present disclosure.

FIG. 1 illustrates an embodiment of an information handling system 100 in accordance with at least one embodiment of the present disclosure. Information handling system 100 can include a set of instructions that can be executed to cause the information handling system to perform any one or more of the methods or computer based functions disclosed herein. Information handling system 100 may operate as a standalone device or may be connected, such as by using a network, to other information handling systems or peripheral devices.

In a networked deployment, information handling system 100 can operate in the capacity of a server or as a client user computer in a server-client user network environment, or as a peer computer system in a peer-to-peer (or distributed) network environment. Information handling system 100 can also be implemented as Or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, information handling system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 includes processor 110, a chipset 120, a memory 130, an input/output interface 140, a network interface 150, a disk controller 160, a disk emulator 170, and a graphics interface 190. Processor 110 is connected to chipset 120. Chipset 120 supports processor 110, allowing processor 110 to process machine-executable code. In a particular embodiment, information handling system 100 includes one or more additional processors, and chipset 120 supports the multiple processors, allowing for simultaneous processing by each of the processors, permitting the exchange of information between the processors and the other elements of information handling system 100. Processor 110 can be connected to chipset 120 via a unique channel, or via a bus that shares information between processor 110, chipset 120, and other elements of information handling system 100.

Memory 130 is connected to chipset 120. Memory 130 can be connected to chipset 120 via a unique channel, or via a bus that shares information between chipset 120, memory 130, and other elements of information handling system 100. In particular, a bus can share information between processor 110, chipset 120 and memory 130. In a particular embodiment, processor 110 is connected to memory 130 through a unique channel. In accordance with another aspect, an information handling system can include a separate memory dedicated to each of the processors. A non-limiting example of memory 130 includes static, dynamic, or non-volatile random access memory (SRAM, DRAM, or NVRAM), another type of memory, or any combination thereof. Memory 130 includes read-only memory (ROM) 135. A non-limiting example of ROM 135 includes NVRAM, erasable-programmable ROM (EPROM), flash memory, another type of read-only memory, or any combination thereof. ROM 135 includes basic input/output system (BIOS) code that is executed during a bootstrap process of information handling system 100 to initialize the various elements of the information handling system, and during operation to process various I/O operations for the information handling system. One function of the BIOS code is to execute a memory reference code during the bootstrap process that initializes and tests memory 130.

I/O interface 140 is connected to chipset 120. I/O interface 140 can be connected to chipset 120 via a unique channel, or via a bus that shares information between chipset 120, I/O interface 140, and other elements of information handling system 100. Other I/O interfaces can also be used in addition to I/O interface 140 if needed or desired. I/O interface 140 is connected to one or more add-on resources 144. Add-on resource 144 can also include another data storage system, a graphics interface, a network interface card (NIC), a sound/video processing card, another suitable add-on resource or any combination thereof.

Network interface device 150 is connected to I/O interface 140. Network interface 150 can be connected to I/O interface 140 via a unique channel, or via a bus that shares information between 110 interface 140, network interface 150, and other elements of information handling system 100. Other network interfaces can also be used in addition to network interface 150 if needed or desired. Network interface 150 can be a NIC disposed within information handling system 100, on a main circuit board (such as a baseboard, a motherboard, or any combination thereof), integrated onto another component such as chipset 120, in another suitable location, or any combination thereof. Network interface 150 includes a network channel 152 that provides an interface between information handling system 100 and other devices that are external to information handling system 100. In a particular embodiment, network interface 150 includes additional network channels.

Disk controller 160 is connected to chipset 110. Disk controller 160 can be connected to chipset 120 via a unique channel, or via a bus that shares information between chipset 120, disk controller 160, and other elements of information handling system 100. Other disk controllers can also be used in addition to disk controller 160 if needed or desired. Disk controller 160 can include a disk interface 162. Disk controller 160 can be connected to one or more disk drives via disk interface 162. Such disk drives include a hard disk drive (HDD) 164, an optical disk drive (ODD) 166 (such as a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 160 is connected to disk emulator 170. Disk emulator 170 permits a solid-state drive 174 to be connected to information handling system 100 via an external interface 172. The external interface can include industry standard busses (such as USB or IEEE 1384 (Firewire)) or proprietary busses, or any combination thereof. Alternatively, solid-state drive 174 can be disposed within information handling system 100.

Graphics interface 180 is connected to chipset 120. Graphics interface 180 can be connected to chipset 120 via a unique channel, or via a bus that shares information between chipset 120, graphics interface 180, and other elements of information handling system 100. Graphics interface 180 is connected to a video display 186. Other graphics interfaces can also be used in addition to graphics interface 180 if needed or desired. Video display 186 can include one or more types of video displays, such as a flat panel display or other type of display device. In a particular embodiment, video display 186 is provided remotely from information handling system 100, such as when information handling system is part of a server system that is remotely managed. Graphics interface 180 includes an option ROM device 184 that includes firmware code that is executed during the bootstrap process of information handling system 100 to initialize graphics interface 180, and during operation to process video information for display on video display 186.

In a particular embodiment, one or more of memory 130, flash memory 135, HDD 164, ODD 166, solid state drive 174, option ROM device 184, or a combination thereof provide a computer-readable medium for storing one or more sets of machine-executable code, or instructions, such as software. For example, the machine-executable code can embody one or more of the methods or logic as described herein. In a particular embodiment, the machine-executable code are embedded completely, or at least partially, within processor 110, memory 130, flash memory 135, HDD 164, ODD 166, solid state drive 174, option ROM device 184, or a combination thereof and can be executed by processor 110. As such, processor 110, memory 130, flash memory 135, HDD 164, ODD 166, solid state drive 174, and option ROM device 184 can include computer-readable non-transitory media. Information handling system 100 can be used to function as a system described below, or can function to carry out one or more of the methods described below.

Figure 2:
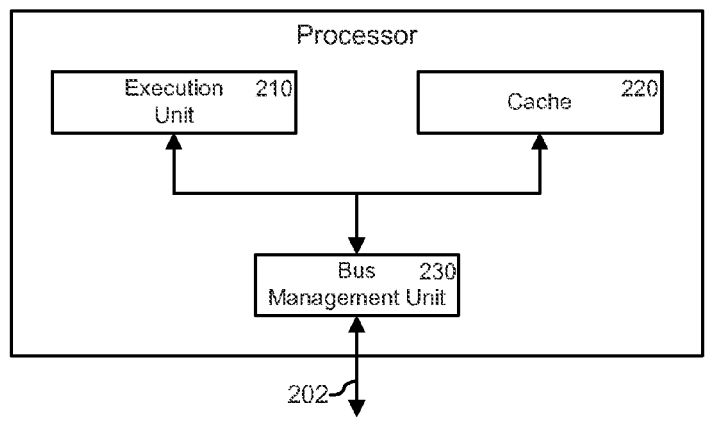
FIG. 2 is a functional block diagram of the processor of FIG. 1.

FIG. 2 illustrates an embodiment of a processor 110, including an execution unit 210, a cache 220, and a bus management unit 230. Execution unit 210 is connected to cache 220 and to bus management unit 230. Bus management unit 230 includes a processor bus 202 that is connected to chipset 120. During the bootstrap process, bus management unit 230 fetches machine-executable code from ROM 135, and provides the machine-executable code to execution unit 210 to execute. The machine-executable code includes system BIOS code. In a particular embodiment, the machine-executable code is also provided to cache 220 such that execution unit 210 gains quicker access to the code. In another embodiment, cache 220 operates in a cache-as-RAM mode, also called a no-eviction cache mode or a no-fill cache mode, to provide a temporary memory space before a memory similar to memory 130 is initialized by the system BIOS. In another embodiment, cache 220 is set to implement a particular write-back policy such that the cache operates like a cache-as-RAM.

In a particular embodiment, the cache-as-RAM mode can be used to provide the resources and capabilities of graphics interface 180 instantly during the bootstrap process. Here the instantly available resources and capabilities of graphics interface 180 are characterized by the fact that the resources and capabilities of graphics interface 180 are available before memory 130 has been initialized by the memory reference code during the bootstrap process. In this way status information and error messages occurring during the execution of the memory reference code can be displayed on video display 186 as the information becomes available, or as the errors occur. Thus, for example, when memory 130 is large, as may be the case when information handling system 100 is part of a server system, the memory initialization code may take a relatively long time to execute. In a particular case, the memory initialization code can take from five to ten minutes or more to execute. Thus the ability to provide status information and error messages is advantageous, as compared to embodiments where a BIOS beep code is relied upon to indicate success or failure of the memory initialization process. In particular, where information handling system 100 is part of a server system that is remotely managed, an operator may not be present at the information handling system at the time of boot, and so the operator may not hear a BIOS beep code indicating that no memory was detected or other errors.

Figure 3:
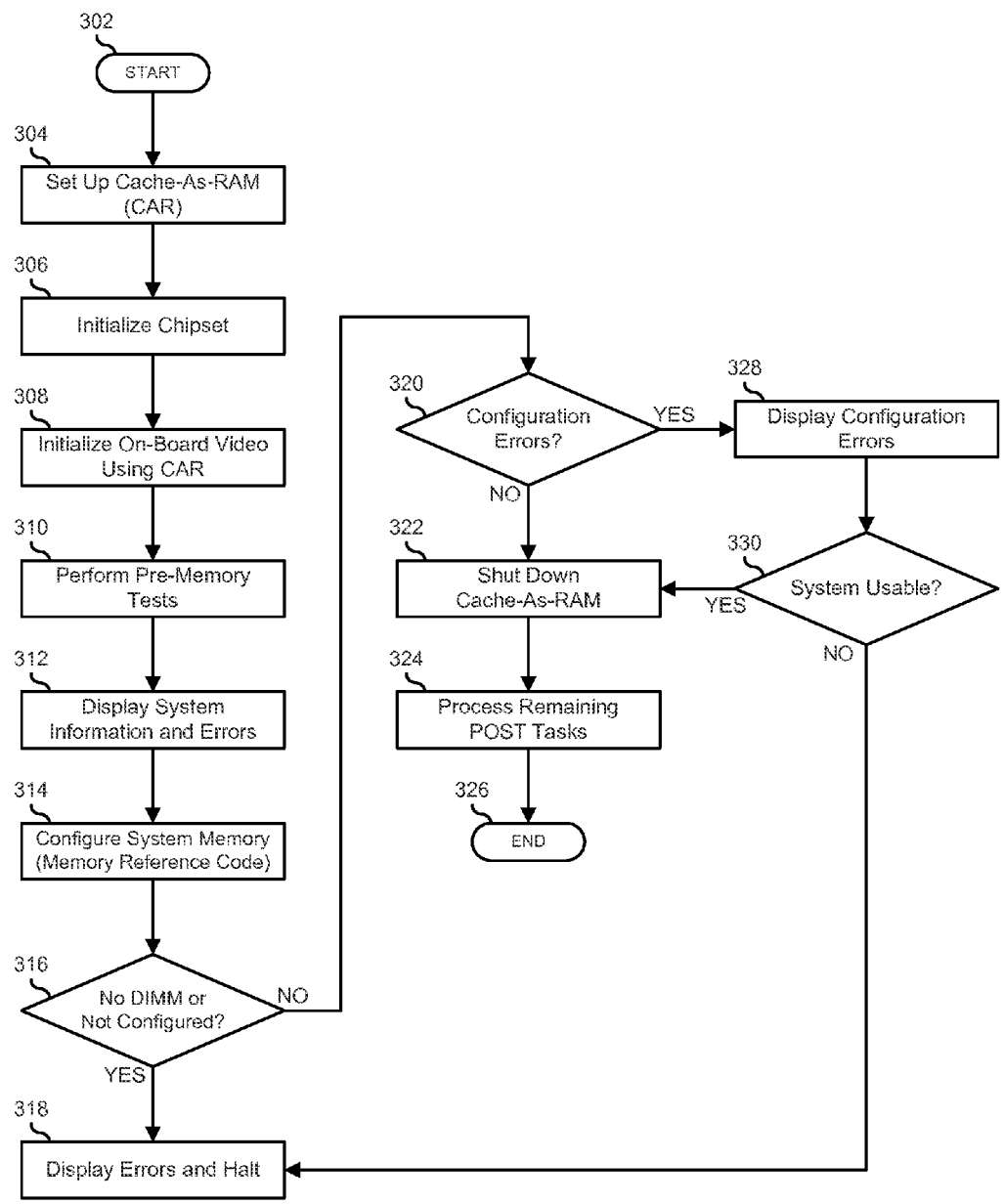
FIG. 3 is a flowchart illustrating a method of bootstrapping an information handling system to enable instant video.

FIG. 3 shows a method of bootstrapping an information handling system to provide instant video on the information handling system, starting at block 302. A processor is set up in a cache-as-RAM mode in block 304. For example, bus management unit 230 can fetch BIOS code from ROM 135 that is executed by execution unit 210 that sets cache 220 into the cache-as-RAM mode. A chipset is initialized in block 306. For example, execution unit 210 can execute BIOS code to initialize chipset 120. In particular, one or more peripheral connect interface (PCI) bridges can be initialized to gain access to video interface 180. An on-board video system is initialized using the cache-as-RAM mode in block 308. Here bus management unit 230 can fetch video option ROM code from option ROM device 184 and load the video option ROM code to cache 220, and execution unit 210 can execute the video option ROM from cache 220 to initialize graphics interface 180 to provide a display capability on video display 186.

Pre-memory tests of the boot process are performed in block 310. For example, a power-on self test (POST) portion of the BIOS code can be fetched by bus management unit 230 for execution by execution unit 210, to initialize various elements of information handling system 100. System information and error conditions resulting from the pre-memory tests are displayed in block 312. Here, execution unit 210 can execute the video option ROM code from cache 220 to provide display information to graphics interface 180 to display the system information and error conditions on video display 186. System memory is configured using the memory reference code in block 314. Here bus management unit 230 can fetch the memory reference code from ROM 135 for execution by execution unit 210 to configure memory 130. A decision is made, based upon the execution of the memory reference code, whether or not any dual in-line memory modules (DIMMs) are installed in the system in decision block 316. If not, the "NO" branch of decision block 316 is taken, and then an error is displayed and the bootstrap process is halted in block 318. For example, memory 130 may be unpopulated with DIMMs, and execution unit 210 can execute the video option ROM code from cache 220 to provide display information to graphics interface 180 to display the error on video display 186, and execution can halt.

If DIMMs are installed in the system and were properly configured, the "YES" branch of decision block 316 is taken, and a decision is made as to whether or not there were any configuration errors in initializing the memory in decision block 320. If so, the "YES" branch of decision block 320 is taken, the configuration error is displayed in block 328, and a decision is made, based upon the character of the configuration errors, as to whether or not the system is usable in decision block 330. If not, the "NO" branch of decision block 330 is taken, and processing continues in block 318, where bootstrap process is halted. If either there were no configuration errors in initializing the memory and the "NO" branch of decision block 320 is taken, or the system is usable and the "YES" branch of decision block 330 is taken, then the cache-as-RAM mode is disabled in block 324. Thus for example, in one case, one or more of the installed DIMMs in memory 130 may have failed to be configured properly, but the configuration error may not be determined to be critical to the further operation of information handling system 100, and so cache 220 can be set such that the cache-as-RAM mode is disabled, and can henceforth operate according to the cache protocol of processor 110. In another case the installed DIMMs in memory 130 may have been properly configured, and so cache 220 can be set such that the cache-as-RAM mode is disabled. The remainder of the bootstrap process and the POST is performed in block 324, and the method ends in block 326.

Figure 4:
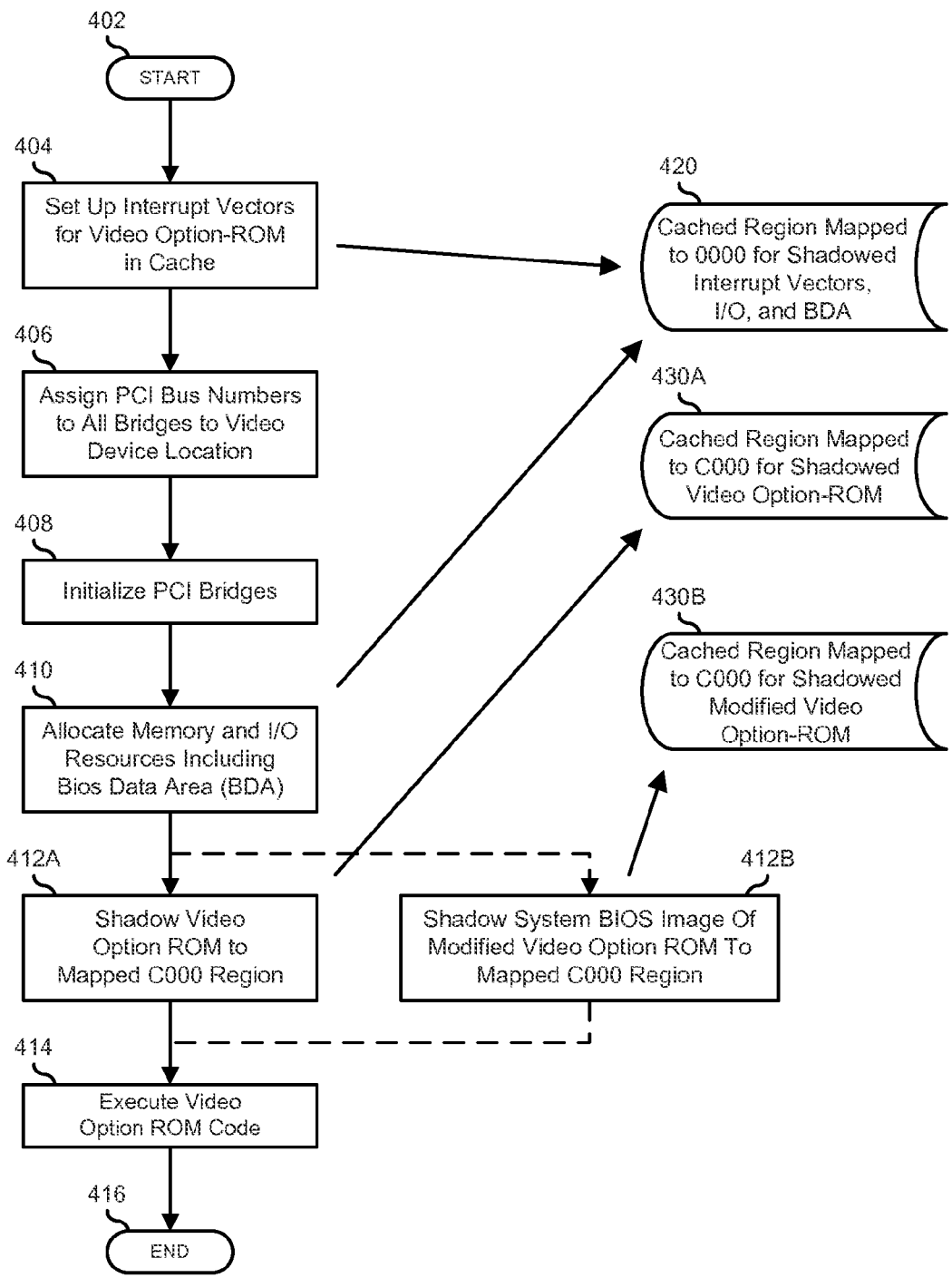
FIG. 4 is a flowchart illustrating a method for initializing a cache-as-RAM for enabling instant video in the method of FIG. 3.

FIG. 4 shows a method for initializing a cache-as-RAM for enabling instant video in the method of FIG. 3. The method starts in block 402, and interrupt vectors are set up and loaded into the cache in block 404. As a result, the cache region mapped to 0000h is shadowed with the interrupt vectors needed to execute video calls, as shown in memory map 420. In this way, the cache includes the supporting interrupt vectors for video functionality, which would normally reside in the system memory, loaded into the cache prior to execution of the memory initialization code. The PCI bus numbers and bridges to the video device are enumerated in block 406, and the enumerated buses and bridges are initialized in block 408. In this way, a path to access the video option ROM is established. Memory and I/O resources, including a BIOS data area (BDA) are allocated in the cache in block 410. As a result, the cache region mapped to 0000h is shadowed with the I/O resources and BDA needed to execute video calls, as shown in memory map 420. In this way, the cache includes the supporting I/O and BDA data structures for video functionality.

In a particular embodiment, the video option ROM code is read from the video option ROM and is shadowed into the cache in block 412A. As a result, the cache region mapped to C000h is shadowed with the video option ROM code, as shown in memory map 430A. The video option ROM code is executed in block 414 to set up the video capabilities of the system, and the method ends in block 416. Here, the video option ROM is executed out of the cache.

In another embodiment, illustrated by the optional block 412B, a modified copy of the video option ROM code is pre-loaded in the system's BIOS ROM. This modified video option ROM code is read from the system's BIOS ROM and is shadowed into the cache in block 412B. As a result, the cache region mapped to C000h is shadowed with the modified video option ROM code, as shown in memory map 430B. The modified video option ROM code is executed in block 414 to set up the video capabilities of the system, and the method ends in block 416. Here, the modified video option ROM is executed out of the BIOS ROM. That is, the code to be executed is accessed not from the cache, but from the BIOS ROM. This embodiment is particularly applicable to processors which provide a write-back mode for the cache that does not permit code fetches from the cache, and that provide a write-protected mode for the cache that permits code fetches, but does not permit memory writes to the cache.

In this embodiment, a writeable memory space is provided by setting up the cache in the write-back mode for data writes to that are executed within the video option ROM code, while the actual execution of the video option ROM code is performed by reading the modified video option ROM directly from the BIOS ROM. As such, the modified video option ROM can be in many aspects a copy of the original video option ROM code from the video option ROM. The modifications can be such that, where the original video option ROM code performs memory writes and reads to memory locations that are within the block of memory allocated to the original video option ROM code, the modified video option ROM code should be modified such that the associated memory writes and reads are not to the memory locations that are within the BIOS ROM, but rather point to memory locations within the cache. As such, a method for providing the modified video option ROM includes decompiling the original video option ROM code, determining the op-codes that provide for reads and for writes within the memory space associated with the original video option ROM, determining the locations where the reads and writes are being performed, and substituting the memory locations in the op-codes with the associated memory locations within the cache.

When referred to as a "device," a "module," or the like, the embodiments described above can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    prior to initializing a memory of an information handling system:
        loading an image of a video option read-only memory (ROM) code to a cache, wherein the video option ROM is for a graphics interface device of the information handling system and the cache is associated with a processor of the information handling system, and wherein the image of the video option ROM code is loaded from a basic input/output (BIOS) ROM device associated with the information handling system;
        executing by the processor the video option ROM code to initialize the graphics interface, wherein executing the video option ROM code further comprises:
            fetching instructions of the video option ROM code from the video option ROM device; and
            executing write instructions of the BIOS ROM code to the cache; and
        executing a memory reference code to initialize the memory.

2. The method of claim 1, further comprising loading a basic input/output system data area to the cache prior to initializing the memory.

3. The method of claim 1, further comprising loading a vector table to the cache prior to initializing the memory.

4. The method of claim 1, wherein the image of the video option ROM code is loaded to the BIOS ROM device from an option ROM device associated with the graphics interface device.

5. The method of claim 1, wherein further the video option ROM code includes instructions to read from a memory location, the memory location being within a block of the cache that includes the image of the video option ROM code.

6. The method of claim 1, further comprising:
    comparing the video option ROM code from before the execution with the video option ROM code from after the execution to determine a location within the video option ROM code that is a data storage location; and
    finding an instruction within the video option ROM code that accesses the data storage location.

7. The method of claim 6, further comprising:
    modifying the video option ROM code such that the instruction accesses a different storage.

8. An information handling system, comprising:
    a processor including a cache, the cache operable in a cache-as-RAM mode;
    a graphics interface including video option read only memory (ROM) code;
    a basic input/output system (BIOS) ROM device including the video option ROM code; and
    a memory;
    wherein the processor is configured to:
        set the cache to the cache-as-RAM mode;
        store an image of the video option ROM code from the BIOS ROM device;
        execute video option ROM code to initialize the graphics interface, wherein in executing the video option ROM code, the processor operates to:
            fetch the video option ROM code from the cache; and
            execute write instructions of the video option ROM code to the BIOS ROM device; and
        execute a memory reference code to initialize the memory after the graphics interface is initialized.

9. The information handling system of claim 8, wherein the processor is further configured to:
    load a basic input/output system data area to the cache prior to initializing the memory.

10. The information handling system of claim 8, further comprising loading a vector table to the cache prior to initializing the memory.

11. The information handling system of claim 8, wherein the image of the video option ROM code is loaded to the BIOS ROM device from an option ROM device associated with the graphics interface device.

12. The information handling system of claim 8, wherein further the video option ROM code includes instructions to read from a memory location, the memory location being within a block of the cache that includes the image of the video option ROM code.

13. The information handling system of claim 8, wherein the processor is further configured to:

compare the video option ROM code from before the execution with the video option ROM code from after the execution to determine a location within the video option ROM code that is a data storage location; and find an instruction within the video option ROM code that accesses the data storage location.

14. The information handling system of claim 13, wherein the processor is further configured to:

modify the video option ROM code such that the instruction accesses a different storage.

15. A non-transitory computer readable medium including code for performing a method, the method comprising:

prior to initializing a memory of an information handling system:

loading an image of a video option read-only memory (ROM) code to a cache, wherein the video option ROM is for a graphics interface device of the information handling system and the cache is associated with a processor of the information handling system, and wherein the image of the video option RUM code is loaded from a basic input/output (BIOS) ROM device associated with the information handling system;

executing by the processor the video option ROM code to initialize the graphics interface, wherein executing the video option ROM code further comprises:

fetching instructions of the video option RUM code from the video option RUM device; and executing write instructions of the BIOS ROM code to the cache; and executing a memory reference code to initialize the memory.

16. The computer readable medium of claim 15, the method further comprising:

loading a basic input/output system data area to the cache prior to initializing the memory.

17. The computer readable medium of claim 15, the method further comprising:

loading a vector table to the cache prior to initializing the memory.

18. The computer readable medium of claim 15, wherein the image of the video option ROM code is loaded to the BIOS ROM device from an option ROM device associated with the graphics interface device.

19. The computer readable medium of claim 15, wherein further the video option ROM code includes instructions to read from a memory location, the memory location being within a block of the cache that includes the image of the video option ROM code.

20. The computer readable medium of claim 15, the method further comprising:

comparing the video option ROM code from before the execution with the video option ROM code from after the execution to determine a location within the video option ROM code that is a data storage location;

finding an instruction within the video option ROM code that accesses the data storage location; and modifying the video option ROM code such that the instruction accesses a different storage.

* * * * *